United States Patent
Choi et al.

(10) Patent No.: US 12,266,128 B2
(45) Date of Patent: Apr. 1, 2025

(54) MOVING ROBOT AND CONTROLLING METHOD FOR THE MOVING ROBOT

(71) Applicant: LG ELECTRONICS INC., Seoul (KR)

(72) Inventors: Juno Choi, Seoul (KR); Janghun Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 656 days.

(21) Appl. No.: 17/436,241

(22) PCT Filed: Mar. 4, 2020

(86) PCT No.: PCT/KR2020/003062
§ 371 (c)(1),
(2) Date: Sep. 3, 2021

(87) PCT Pub. No.: WO2020/180107
PCT Pub. Date: Sep. 10, 2020

(65) Prior Publication Data
US 2022/0175210 A1 Jun. 9, 2022

(30) Foreign Application Priority Data
Mar. 5, 2019 (KR) .................. 10-2019-0024996

(51) Int. Cl.
*G06T 7/60* (2017.01)
*G01B 11/25* (2006.01)
(Continued)

(52) U.S. Cl.
CPC .............. *G06T 7/60* (2013.01); *G01B 11/254* (2013.01); *G05D 1/0238* (2013.01);
(Continued)

(58) Field of Classification Search
CPC . G06T 7/60; G06T 7/521; G06T 2207/10028; G06T 2207/30261;
(Continued)

(56) References Cited

U.S. PATENT DOCUMENTS 9,440,355 B2    9/2016  Noh et al.
2007/0267570 A1* 11/2007  Park ...................... A47L 9/009
                                               250/221

(Continued)

FOREIGN PATENT DOCUMENTS

DE    10-2017-114965    1/2018
JP    11-063986         3/1999
(Continued)

OTHER PUBLICATIONS

International Search Report dated Jul. 2, 2020 issued in Application No. PCT/KR2020/003062.
(Continued)

*Primary Examiner* — Donald J Wallace
(74) *Attorney, Agent, or Firm* — KED & ASSOCIATES, LLP

(57) ABSTRACT

The present disclosure analyzes the image around the main body, detects the depth of the floor surface and the height of the floor surface beyond the obstacle, and determines whether to climb the obstacle.

17 Claims, 7 Drawing Sheets

(51) Int. Cl.
   *G05D 1/00* (2006.01)
   *G06T 7/521* (2017.01)
   *A47L 11/40* (2006.01)
(52) U.S. Cl.
   CPC ........... *G05D 1/0246* (2013.01); *G06T 7/521* (2017.01); *A47L 11/4011* (2013.01); *A47L 2201/04* (2013.01); *G06T 2207/10028* (2013.01); *G06T 2207/30261* (2013.01)
(58) Field of Classification Search
   CPC .. G01B 11/254; G05D 1/0238; G05D 1/0246; G05D 1/0214; A47L 11/4011; A47L 2201/04; A47L 9/2805; A47L 9/2852; A47L 9/009; G06V 10/145; B25J 9/1666; B25J 5/007; B25J 9/1676; B25J 9/1697; B25J 11/0085; B25J 19/021
   See application file for complete search history.

(56) References Cited

U.S. PATENT DOCUMENTS

| | | | |
|---|---|---|---|
| 2015/0120056 A1* | 4/2015 | Noh | G01S 7/4814 901/1 |
| 2015/0185322 A1 | 7/2015 | Haegermarck | |
| 2017/0332871 A1* | 11/2017 | Sung | G01S 17/46 |
| 2018/0011493 A1* | 1/2018 | Terada | G05D 1/0214 |
| 2020/0039079 A1* | 2/2020 | Brouwers | A47L 9/2826 |
| 2020/0207394 A1* | 7/2020 | Malghan | B62D 57/024 |

FOREIGN PATENT DOCUMENTS

| | | |
|---|---|---|
| KR | 10-0635828 | 10/2006 |
| KR | 10-0664061 | 1/2007 |
| KR | 10-0735565 | 7/2007 |
| KR | 10-2012-0126771 | 11/2012 |
| KR | 10-2018-0022205 | 3/2018 |
| KR | 10-2018-0024326 | 3/2018 |
| KR | 10-2018-0079429 | 7/2018 |
| KR | 10-2019-0000362 | 1/2019 |

OTHER PUBLICATIONS

Australian Office Action dated Oct. 10, 2022 issued in Application No. 2020231781.
European Search Report dated Nov. 7, 2022 issued in Application No. 20766507.6.
Korean Notice of Allowance dated Feb. 28, 2023 issued in Application No. 10-2021-0002035.

\* cited by examiner

MOVING ROBOT AND CONTROLLING METHOD FOR THE MOVING ROBOT

CROSS-REFERENCE TO RELATED PATENT APPLICATIONS

This application is a U.S. National Stage Application under 35 U.S.C. § 371 of PCT Application No. PCT/KR2020/003062, filed Mar. 4, 2020, which claims priority to Korean Patent Application No. 10-2019-0024996, filed Mar. 5, 2019, whose entire disclosures are hereby incorporated by reference.

TECHNICAL FIELD

The present disclosure relates to a moving robot, and more particularly, to a moving robot that can check a step of a floor beyond an obstacle and avoid beforehand.

BACKGROUND ART

Robots have been developed for industrial use and have been part of factory automation. In recent years, as the application field of robots has been further expanded, medical robots, aerospace robots, and the like have been developed, and household robots that can be used in ordinary homes have been manufactured. Among these robots, a robot capable of traveling by itself is referred to as a moving robot. A typical example of a moving robot used at home is a robot cleaner.

Various technologies for detecting an environment around the robot cleaner and a user through various sensors provided in the robot cleaner are known. In addition, technologies which allow a robot cleaner to learn and map a traveling area by itself, and grasps a current position on a map are known. Robot cleaners that travel and clean a travel area in a preset manner are known.

Conventional robot cleaners have been used an optical sensor that can easily determine distance, identify terrain, and identify image of obstacle so as to determine distance to obstacle or wall and to perform mapping in the surrounding environment of the robot cleaner.

In addition, in the related art (Korean Patent Publication No. 1020120078382), since a sensor is provided in a bottom of a main body, the sensor detects the bottom of the main body to detect a cliff, and prevents the robot cleaner from moving to the cliff.

However, when using a cliff sensor of the related art, the robot cleaner must be close to the cliff so as to recognize the existence of the cliff, and a part of a robot cleaner body is positioned on the cliff to recognize the existence of the cliff. Therefore, there is a problem that the robot cleaner often falls into the cliff.

In addition, in a place of floors having different heights like a room and a veranda, a rail such as a chassis is generally installed for movement of a door. Such a chassis is recognized as a low obstacle, so that the robot cleaner climbs the chassis. When the robot cleaner climbs the chassis, the robot cleaner may fall to the floor of the veranda while the robot cleaner travels, such as a change of direction. However, if the floor of the veranda has a lower height than the floor of the room, there is a problem that the robot cleaner cannot climb the chassis from the floor of the veranda, and the robot cleaner is trapped in the veranda.

DISCLOSURE OF INVENTION

Technical Problem

The present disclosure has been made in view of the above problems, and provides a moving robot for detecting a cliff beyond an obstacle to determine whether to climb an obstacle.

The present disclosure further provides a moving robot that can enter perpendicularly with respect to a boundary line of an obstacle.

The present disclosure further provides a moving robot that recognizes a cliff beyond an obstacle beforehand to prevent falling to the cliff.

Solution to Problem

In order to solve the above problems, the present disclosure analyzes the image around the main body, detects the height of the floor surface beyond the obstacle, and determines whether to climb the obstacle.

In detail, the present disclosure includes: an image acquisition step of acquiring an image of a front of the moving robot; a detection step of detecting an obstacle and a front floor surface in front of the obstacle from the acquired image; a calculation step of calculating a height of the obstacle and a depth of the front floor surface; and a climbing avoidance step of climbing or avoiding the obstacle by the moving robot based on the height of the obstacle and the depth of the front floor surface.

In the climbing avoidance step, the moving robot climbs the obstacle, when the height of the obstacle is smaller than a reference height and the depth of the front floor surface is smaller than a reference depth.

In the climbing avoidance step, the moving robot avoids the obstacle, when the height of the obstacle is smaller than a reference height and the depth of the front floor surface is deeper than a reference depth.

In the climbing avoidance step, the moving robot avoids the obstacle, when the height of the obstacle is higher than a reference height.

The depth of the front floor surface is a summed value of a height value of the obstacle and a step value between a present floor surface where the moving robot is currently positioned and the front floor surface.

The depth of the front floor surface is a depth of the floor surface spaced by 30 cm to 90 cm forward from the moving robot.

The depth of the front floor surface is set to the same value as a climbable height of the moving robot.

The depth of the front floor surface is calculated by irradiating a light of a certain pattern toward a front floor by the moving robot, detecting the pattern from the acquired image, calculating a distance to the pattern based on the pattern, and comparing the calculated distance to the pattern with a reference distance.

The method further includes a registration step of registering the obstacle on an obstacle map as a climbable obstacle, when the moving robot climbs or avoids the obstacle.

In accordance with another aspect of the present disclosure, a moving robot includes: a driving motor configured to drive a wheel; an image acquisition unit configured to acquire an image of surroundings of the moving robot and an image of an obstacle; and a controller configured to control a first driving motor and a second driving motor by analyzing the image acquired by the image acquisition unit, wherein the controller analyzes the image acquired by the image acquisition unit, calculates a height of the obstacle and a depth of a front floor surface, and controls the driving motor based on the height of the obstacle and the depth of the front floor surface.

The controller controls the driving motor so that the moving robot climbs the obstacle, when the height of the obstacle is smaller than a reference height and the depth of the front floor surface is smaller than a reference depth.

The controller controls the driving motor so that the moving robot avoids the obstacle, when the height of the obstacle is smaller than a reference height and the depth of the front floor surface is deeper than a reference depth.

In addition, the present disclosure includes: a driving motor configured to drive a wheel; a pattern irradiation unit configured to irradiate a light of a certain pattern to surroundings of the moving robot; an image acquisition unit configured to acquire an image of the surroundings of the moving robot and an image of an obstacle; and a controller configured to control a first driving motor and a second driving motor by analyzing the pattern from the image acquired by the image acquisition unit, wherein the controller analyzes the pattern from the image acquired by the image acquisition unit, calculates a height of the obstacle and a depth of a front floor surface, and controls the driving motor based on the height of the obstacle and the depth of the front floor surface.

The pattern irradiation unit irradiates a light of the pattern to between a front side and a lower side of the moving robot.

The controller calculates the depth of the front floor surface by detecting the pattern from the acquired image, calculating a distance to the pattern based on the pattern, and comparing the calculated distance to the pattern with a reference distance.

Advantageous Effects of Invention

According to the moving robot of the present disclosure has one or more of the following effects.

First, when the moving robot climbs an obstacle, the present disclosure does not simply consider the height of an obstacle, but considers the height of the floor surface beyond the obstacle, thereby preventing the moving robot from not being able to return to the current position from beyond the obstacle, and preventing from being trapped in a space beyond the obstacle.

Second, since the moving robot enter an obstacle vertically, it is possible to prevent the restraint of the main body caused by obliquely climbing an obstacle, and to prevent a wheel from being restrained to a rail when climbing a chassis.

Third, the present disclosure prevents the moving robot from climbing the rail or the chassis unnecessarily by previously recognizing the floor height of a space beyond an obstacle, prevents unnecessary climbing of the moving robot, and quickly cleans the area requiring cleaning.

Fourth, in the present disclosure, since the moving robot enters an obstacle vertically, it is possible to prevent the restraint of the main body caused by obliquely climbing an obstacle, and to prevent a wheel from being restrained to a rail when climbing a chassis.

Fifth, since the present disclosure grasps an obstacle and the situation of the floor beyond the obstacle through a camera originally mounted in the robot cleaner, it can be determined whether to climb the obstacle without adding a sensor.

The effects of the present invention are not limited to the effects mentioned above, and other effects not mentioned can be clearly understood by those skilled in the art from the description of the claims.

BEST MODE FOR CARRYING OUT THE INVENTION

Figure 1:
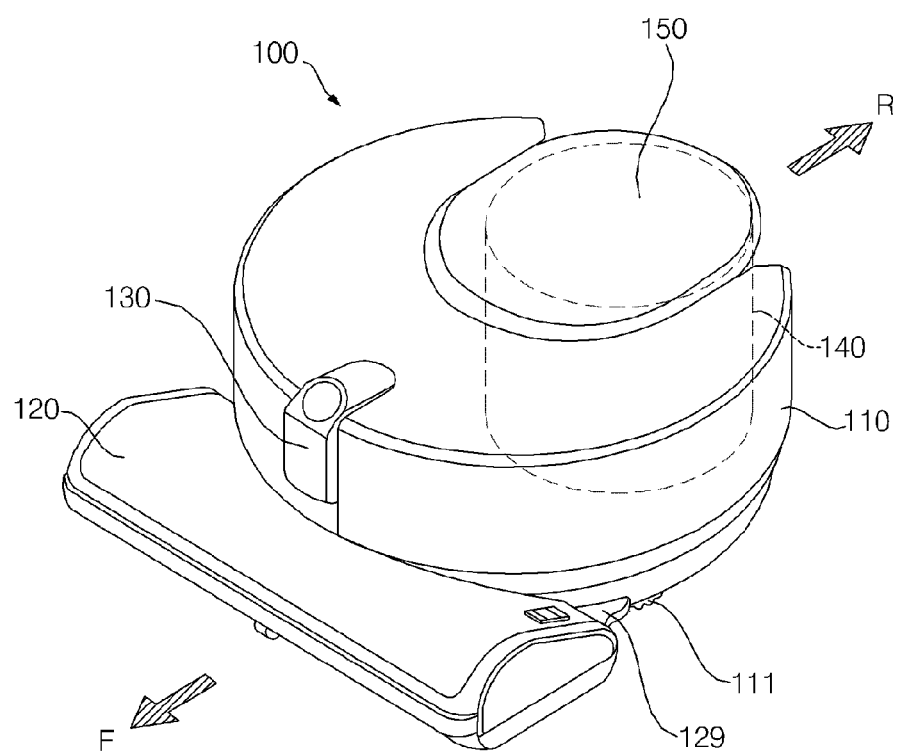
FIG. 1 is a perspective view showing an example of a robot cleaner according to the present disclosure.

Exemplary embodiments of the present disclosure are described with reference to the accompanying drawings in detail. However, the embodiment is not limited to specific embodiments, but the embodiment includes all modifications, equivalents, and/or substitutes belonging to the technical scope of the embodiment without departing from the spirit of the embodiment. The same reference numbers are used throughout the drawings to refer to the same or like parts. Detailed descriptions of well-known functions and structures incorporated herein may be omitted to avoid obscuring the subject matter of the present disclosure.

The terms spatially relative, "below", "beneath", "lower", "above" and "upper" and the like can be used to easily describe the correlation of elements with other elements. Spatially relative terms should be understood in terms of the directions shown in the drawings, including the different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

The terminology used herein is for the purpose of illustrating embodiments and is not intended to restrict the invention. In this specification, singular forms include plural forms unless the context clearly dictates otherwise. It is noted that the terms "comprises" and/or "comprising" used in the specification mean that mentioned elements, steps, and/or operations do not exclude the presence or addition of one or more of other elements, steps, and/or operations.

Unless defined otherwise, all terms (including technical and scientific terms) used herein may be used in a sense commonly understood by a person having ordinary skill in the art to which the claimed invention pertains. In addition, commonly used predefined terms are not ideally or excessively interpreted unless explicitly defined otherwise.

A moving robot 100 of the present disclosure means a robot that can move itself by using a wheel or the like, and may be a home helper robot or a robot cleaner.

Hereinafter, a robot cleaner according to the present disclosure is explained in detail with reference to drawings.

Exemplary embodiments disclosed herein will be described in detail with reference to the accompanying drawings, but the technical terms used herein are merely used to describe specific embodiments, and it should be noted they are not intended to limit the spirit of the technology disclosed herein.

Figure 2:
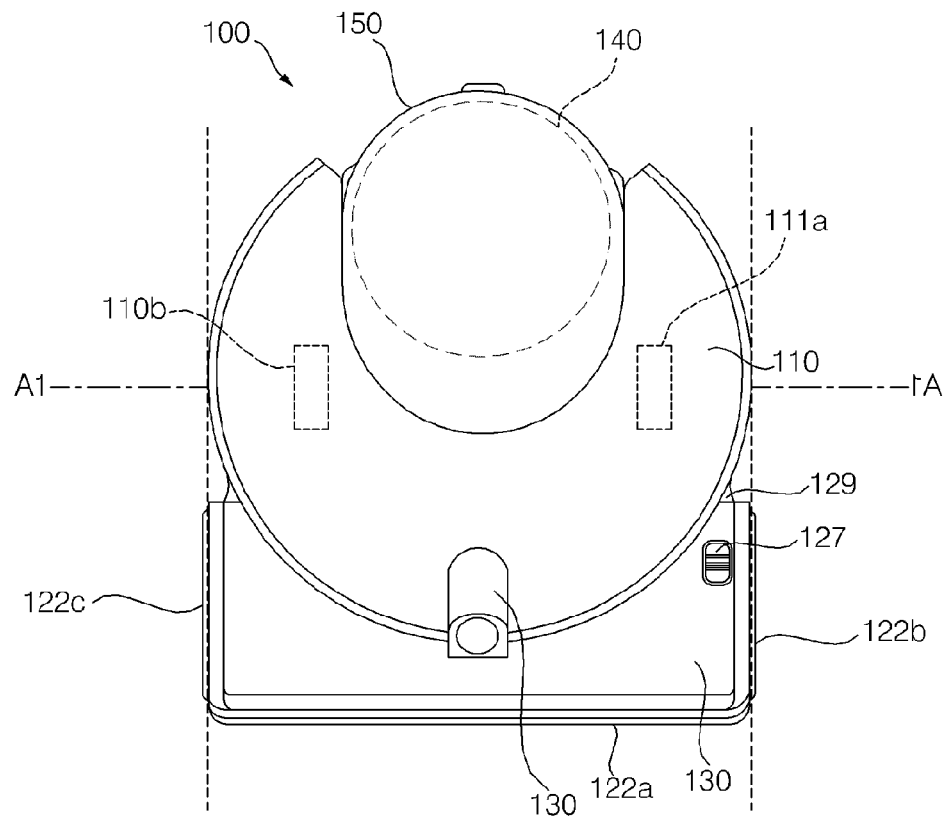
FIG. 2 is a plan view of the robot cleaner shown in FIG. 1.
Figure 3:
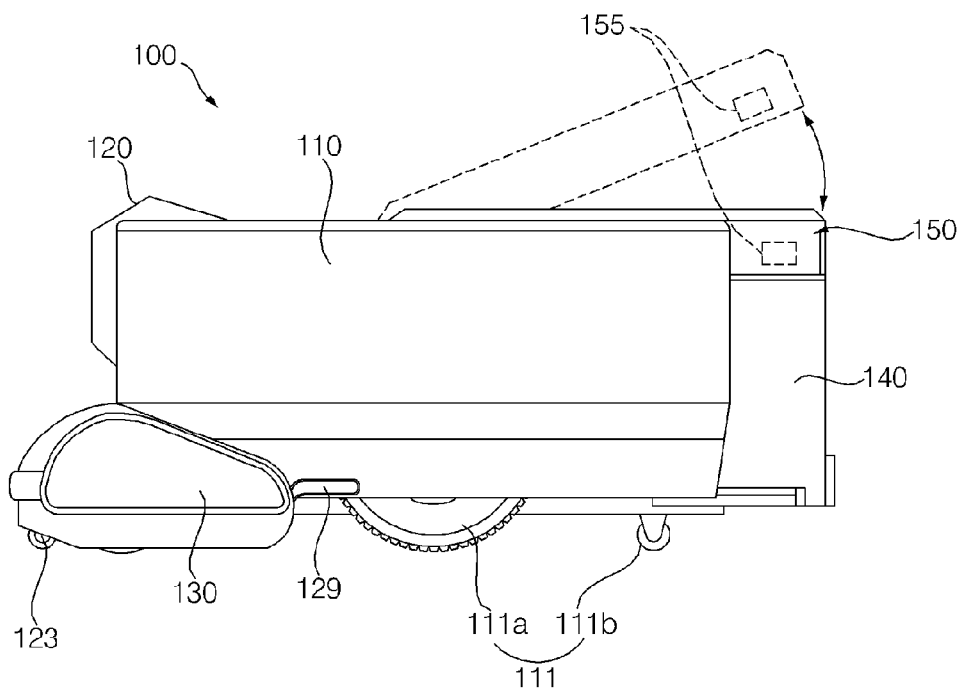
FIG. 3 is a side view of the robot cleaner shown in FIG. 1.

FIG. 1 is a perspective view showing an example of a robot cleaner 100 according to the present disclosure, FIG. 2 is a plan view of the robot cleaner 100 shown in FIG. 1, and FIG. 3 is a side view of the robot cleaner 100 shown in FIG. 1.

In this document, a moving robot, and a cleaner performing autonomous traveling may be used in the same sense. In addition, in this document, a plurality of cleaners may be configured to include at least some of the configuration shown in FIGS. 1 to 3.

Referring to FIGS. 1 to 3, the robot cleaner 100 serves to clean a floor while traveling a certain area by itself. The cleaning of the floor here includes suctioning dust (including foreign matter) from the floor or wiping the floor.

The robot cleaner 100 may include a cleaner body 110, a cleaning unit 120, a sensing unit 130, and a dust container 140. The cleaner body 110 includes a controller 1800 for controlling the robot cleaner 100 and includes various components mounted or installed therein. In addition, the cleaner body 110 is provided with a wheel unit 111 for traveling of the robot cleaner 100. The robot cleaner 100 may be moved back, forth, left, and right by the wheel unit 111 or rotated.

The robot cleaner 100 according to another embodiment may include a first driving motor 1310, a second driving motor 1320, an image acquisition unit, and a controller 1800 for controlling the first driving motor 1310 and the second driving motor 1320. The first driving motor 1310 and the second driving motor 1320 may be collectively referred to as a driving motor.

The robot cleaner 100 according to another embodiment may include a driving motor, a pattern irradiator, an image acquisition unit, and a controller 1800 for controlling the driving motor. In addition, the pattern irradiator and the image acquisition unit may be collectively referred to as a sensor unit or a sensing unit.

Referring to FIG. 3, the wheel unit 111 includes a main wheel 111a, 111b and a sub wheel 111c. Obviously, the wheel unit 111 may omit the sub wheel 111c and be provided with only the main wheel 111a, 111b.

The main wheel 111a, 111b may include a left wheel 111a and a right wheel 111b provided in both sides of the cleaner body 110, respectively. The main wheel 111a, 111b is configured to be rotatable in one direction or the other direction according to a control signal of the controller 1800.

Each of the left wheel 111a and the right wheel 111b may be configured to be driven independently of each other. For example, the left wheel 111a and the right wheel 111b may be driven by different motors. Alternatively, it may be driven by a plurality of different shafts provided in a single motor. For example, the left wheel 111a may be driven by the first driving motor 1310, and the right wheel 111b may be driven by the second driving motor 1320.

Rotation is achieved based on the rotational axis A1 of the left wheel 111a and the right wheel 111b, and the rotational axis of the left wheel 111a and the rotational axis of the right wheel 111b may coincide with each other.

The sub wheel 111c supports the cleaner body 110 together with the main wheel 111a, 111b, and is configured to assist the traveling of the robot cleaner 100 by the main wheel 111a, 111b. Such a sub wheel 111c may also be provided in the cleaning unit 120 described later.

The controller 1800 controls the driving of the wheel unit 111, so that the robot cleaner 100 travels autonomously on the floor.

Meanwhile, the cleaner body 110 is equipped with a battery (not shown) for supplying power to the robot cleaner (100). The battery may be configured to be chargeable, and may be detachably attached to the bottom of the cleaner body 110.

In FIG. 1, the cleaning unit 120 may be disposed to protrude from one side of the cleaner body 110, and may suck air containing dust or may perform wiping. One side may be a side where the cleaner body 110 travels in the forward direction F, that is, may be a front side of the cleaner body 110.

In this drawing, it is shown that the cleaning unit 120 is formed to protrude to the front side and both the left and right sides from one side of the cleaner body 110. Specifically, the front end of the cleaning unit 120 is disposed in a position spaced forward from one side of the cleaner body 110, and both ends of the left and right sides of the cleaning unit 120 are disposed in a position spaced apart from one side of the cleaner body 110 to both left and right sides, respectively.

As the cleaner body 110 is formed in a circular shape, and both sides of the rear end of the cleaning unit 120 protrude from the cleaner body 110 to both sides of the left and right sides respectively, an empty space, i.e., a gap may be formed between the cleaner body 110 and the cleaning unit 120. The empty space is a space between both the left and right end sides of the cleaner body 110 and both the left and right end sides of the cleaning unit 120, and has a shape recessed into the robot cleaner 100.

When an obstacle CA is caught in the empty space, the robot cleaner 100 may trapped by an obstacle CA and may not move. To prevent this, a cover member 129 may be disposed to cover at least a portion of the empty space.

The cover member 129 may be provided in the cleaner body 110 or the cleaning unit 120. In the present embodiment, it is shown that the cover member 129 is protruded from both sides of rear end of the cleaning unit 120 respectively, and is disposed to cover the outer circumferential surface of the cleaner body 110.

The cover member 129 is disposed to fill at least a part of the empty space, that is, the empty space between the cleaner body 110 and the cleaning unit 120. Therefore, it is possible to implement a structure that can prevent an obstacle CA from being caught in the empty space, or a structure that can be easily escaped from an obstacle CA even if an obstacle CA is caught in the empty space.

The cover member 129 protruding from the cleaning unit 120 may be supported on the outer circumferential surface of the cleaner body 110. If the cover member 129 protrudes from the cleaner body 110, the cover member 129 may be supported on the rear portion of the cleaning unit 120. According to the structure, when the cleaning unit 120 is shocked by hitting an obstacle CA, a portion of the shock may be transmitted to the cleaner body 110, so that the shock can be dispersed.

The cleaning unit 120 may be detachably coupled to the cleaner body 110. When the cleaning unit 120 is separated from the cleaner body 110, a wipe module (not shown) may be detachably coupled to the cleaner body 110 by replacing the separated cleaning unit 120.

Accordingly, the user may mount the cleaning unit 120 in the cleaner body 110 to remove dust from the floor, and install the wipe module in the cleaner body 110 to clean the floor.

When the cleaning unit 120 is mounted in the cleaner body 110, the mounting may be guided by the cover member 129 described above. That is, as the cover member 129 is disposed to cover the outer circumferential surface of the cleaner body 110, the relative position of the cleaning unit 120 with respect to the cleaner body 110 may be determined.

The cleaning unit 120 may be provided with a caster 123. The caster 123 is configured to assist the traveling of the robot cleaner 100 and also support the robot cleaner 100. The sensing unit 130 is disposed in the cleaner body 110. As shown, the sensing unit 130 may be disposed in one side of the cleaner body 110 in which the cleaning unit 120 is positioned, that is, in the front side of the cleaner body 110.

The sensing unit 130 may be disposed to overlap with the cleaning unit 120 in the vertical direction of the cleaner body 110. The sensing unit 130 is disposed above the cleaning unit 120, and is configured to detect an obstacle CA or a characteristic ahead so that the cleaning unit 120 positioned in front of the robot cleaner 100 does not collide with an obstacle CA.

The sensing unit 130 may be configured to additionally perform other sensing functions in addition to such a detection function. For example, the sensing unit 130 may include a camera (not shown) for acquiring the surrounding image. The camera 131 may include a lens and an image sensor. In addition, the camera converts an image around the cleaner body 110 into an electrical signal that can be processed by the controller 1800 and, for example, may transmit an electrical signal corresponding to the upper image to the controller 1800. The electrical signal corresponding to the upper image may be used by the controller 1800 to detect the position of the cleaner body 110.

Obviously, the sensing unit 130 may include an image acquisition unit. The image acquisition unit may include a three-dimensional depth camera for acquiring the surrounding image and a distance between the main body and an obstacle CA. The three-dimensional depth camera is described later.

In addition, the sensing unit 130 may detect an obstacle CA such as a wall, furniture, and a cliff on a traveling surface or a traveling path of the robot cleaner 100. In addition, the sensing unit 130 may detect the existence of a docking device that performs battery charging. In addition, the sensing unit 130 may detect ceiling information to map the traveling area or the cleaning area of the robot cleaner 100.

The cleaner body 110 is detachably coupled to a dust container 140 for separating and collecting dust in the sucked air. In addition, the dust container 140 is provided with a dust container cover 150 covering the dust container 140. In one embodiment, the dust container cover 150 may be configured to be hinged to the cleaner body 110 and be rotatable. The dust container cover 150 may be fixed to the dust container 140 or the cleaner body 110 to maintain a state of covering the upper surface of the dust container 140. In a state in which the dust container cover 150 is disposed to cover the upper surface of the dust container 140, the dust container 140 may be prevented from being separated from the cleaner body 110 by the dust container cover 150.

A part of the dust container 140 is accommodated in a dust container accommodating part 113, but the other part of the dust container 140 protrudes toward the rear of the cleaner body 110 (i.e., the reverse direction R opposite to the forward direction F).

The dust container 140 is provided with an inlet through which air containing dust is introduced and an outlet through which air separated from the dust is discharged. When the dust container 140 is mounted in the cleaner body 110, the inlet and the outlet are configured to communicate through an opening 155 formed in the inner wall. Thus, an intake flow path and an exhaust flow path may be formed inside the cleaner body 110.

According to such a coupling relationship, the air containing the dust introduced through the cleaning unit 120 is introduced into the dust container 140 via the intake flow path inside the cleaner body 110, and the air and the dust are separated from each other while passing through a filter or a cyclone of the dust container 140. The dust is collected in the dust container 140, and the air is discharged from the dust container 140 and then finally discharged to the outside through an exhaust port 112 via the exhaust flow path inside the cleaner body 110.

Hereinafter, in FIG. 4, an embodiment related to the components of the robot cleaner 100 will be described.

The robot cleaner 100 according to an embodiment of the present disclosure may include at least one or a combination of a communication unit 1100, an input unit 1200, a traveling unit 1300, a sensing unit 1400, an output unit 1500, a power supply unit 1600, a memory 1700, a controller 1800, and a sweeping unit 1900.

In detail, the robot cleaner 100 according to a first embodiment of the present disclosure may include the traveling unit 1300, an image acquisition unit, and the controller 1800.

Figure 4:
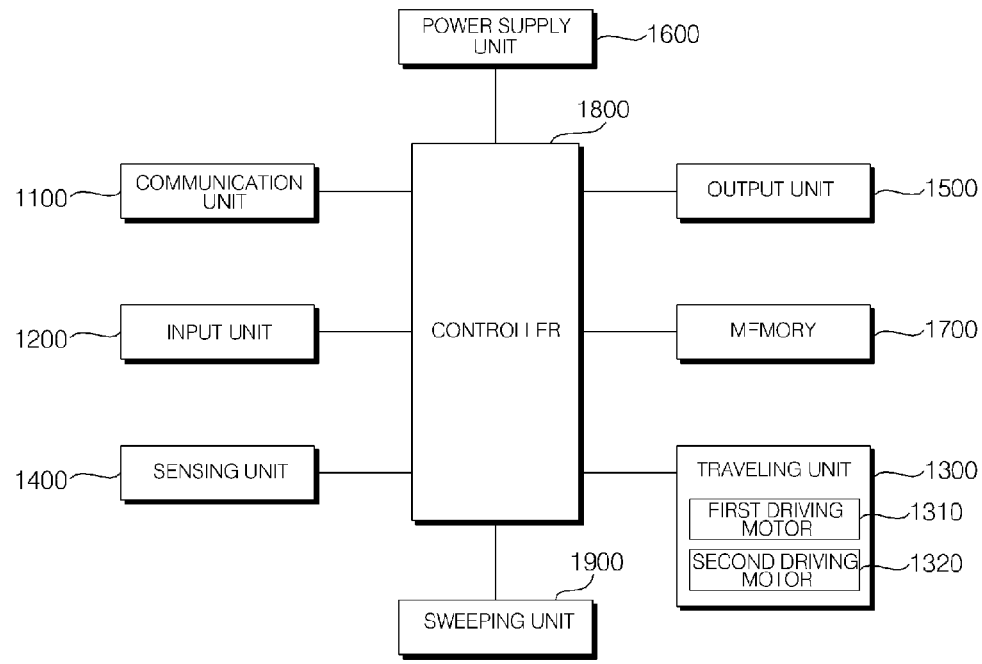
FIG. 4 is a block diagram illustrating exemplary components of a robot cleaner according to an embodiment of the present disclosure.

At this time, the components shown in FIG. 4 are not essential. Therefore, it is obvious that a moving robot having more or fewer components than those can be implemented. In addition, as described above, a plurality of robot cleaners described in the present disclosure may include only some of the components described below. That is, a plurality of moving robots may be configured of different components, respectively.

Hereinafter, each of the components will be described. First, the power supply unit 1600 includes a battery that can be charged by an external commercial power and supplies power to the moving robot. The power supply unit 1600 may supply driving power to each of the components included in the moving robot, thereby supplying operation power required for the moving robot to travel or perform a specific function.

At this time, the controller 1800 may detect the remaining power of the battery. If the remaining power is insufficient, the controller 1800 may control to move to a charging stand connected to the external commercial power, and may charge the battery by receiving a charging current from the charging stand. The battery may be connected to a battery detector so that the battery remaining amount and the charging state may be transmitted to the controller 1800. The output unit 1500 may display the battery remaining amount by the controller 1800.

The battery may be positioned in the lower portion of the center of the moving robot, or may be positioned in either the left or the right side. In the latter case, the moving robot may further include a counterweight to eliminate the weight bias of the battery.

Meanwhile, the traveling unit 1300 is provided with a motor, and the motor may be driven to rotate or move the main body by rotating the left and right main wheels in both directions. At this time, the left and right main wheels can move independently. The traveling unit 1300 may progress the main body of the moving robot in front, rear, left, and right directions, may travel the vehicle curvedly, or may rotate it in place.

Meanwhile, the input unit 1200 receives various control commands for the moving robot from user. The input unit 1200 may include one or more buttons. For example, the input unit 1200 may include a confirmation button, a setting button, and the like. The confirmation button is a button for receiving a command for confirming detection information, obstacle CA information, location information, map information from the user, and the setting button is a button for receiving a command for setting the information from the user.

In addition, the input unit 1200 may include an input reset button to cancel a previous user input and receive a user input again, a delete button to delete a preset user input, a button to set or change the operating mode, a button to receive command of returning to a charging stand, and the like.

In addition, the input unit 1200 may be installed in the upper portion of the moving robot as a hard key, a soft key, a touch pad, or the like. In addition, the input unit 1200 may have a form of a touch screen together with the output unit 1500.

Meanwhile, the output unit 1500 may be installed in the upper portion of the moving robot. Obviously, the installation location or installation form may be changed. For example, the output unit 1500 may display a battery state or a traveling type on a screen.

In addition, the output unit 1500 may output state information inside the moving robot detected by the sensing unit 1400, for example, the current state of components included in the moving robot. In addition, the output unit 1500 may display external state information detected by the sensing unit 1400, obstacle CA information, location information, map information, or the like on the screen.

The output unit 1500 may be formed of any one element of a light emitting diode (LED), a liquid crystal display (LCD), a plasma display panel, and an organic light emitting diode (OLED).

The output unit 1500 may further include a sound output means for audibly outputting an operation process or an operation result of the moving robot performed by the controller 1800. For example, the output unit 1500 may output a warning sound to the outside according to a warning signal generated by the controller 1800.

In this case, the sound output means (not shown) may be a means such as a beeper, and a speaker for outputting sounds, and the output unit 1500 may output to the outside through the sound output means by using audio data or message data having a certain pattern stored in the memory 1700.

Therefore, the moving robot according to an embodiment of the present disclosure may output the environment information related to the traveling area on the screen through the output unit 1500 or output a sound. According to another embodiment, the moving robot may transmit map information or environment information to a terminal device through the communication unit 1100 so that the terminal device outputs a screen or sound which is to be outputted through the output unit 1500.

The memory 1700 stores a control program for controlling or driving the moving robot and corresponding data. The memory 1700 may store audio information, image information, obstacle CA information, location information, map information, and the like. In addition, the memory 1700 may store information related to a traveling pattern.

The memory 1700 mainly uses nonvolatile memory. Here, non-volatile memory (NVM, NVRAM) is a storage device that can maintain the stored information even when power is not supplied. For example, it may be ROM, Flash memory, magnetic computer memory device (e.g., hard disk, diskette drive, magnetic tape), optical disk drive, magnetic RAM, PRAM, and the like.

Meanwhile, the sensing unit 1400 may include at least one of an external signal detection sensor, a front detection sensor, a cliff detection sensor, a two-dimensional (2D) camera sensor, and a three-dimensional (3D) camera sensor.

The external signal detection sensor may detect an external signal of the moving robot. The external signal detection sensor may be, for example, an infrared ray sensor, an ultrasonic sensor, a radio frequency (RF) sensor, or the like.

The moving robot can check the position and direction of the charging stand by receiving a guide signal generated by the charging stand by using the external signal detection sensor. At this time, the charging stand may transmit a guide signal indicating the direction and distance so that the moving robot can return. That is, the moving robot may receive a signal transmitted from the charging stand to determine the current position and set the direction of movement to return to the charging stand.

Meanwhile, the front detection sensor may be installed in the front side of the moving robot, specifically, at a certain interval along the side outer circumference surface of the moving robot. The front detection sensor is positioned in at least one side surface of the moving robot to detect an obstacle CA ahead, and the front detection sensor detects an object existing in the moving direction of the moving robot, in particular, an obstacle CA and may transfer detection information to the controller 1800. That is, the front detection sensor may detect protrusions, household appliances, furniture, walls, wall edges, and the like existing on the moving path of the moving robot and transmit the information to the controller 1800.

The front detection sensor may be, for example, an infrared sensor, an ultrasonic sensor, an RF sensor, a geomagnetic sensor, or the like, and the moving robot may use one type of sensor as the front detection sensor or use two or more types of sensors together as needed.

For example, the ultrasonic sensor may generally be mainly used to detect a remote obstacle CA. The ultrasonic sensor may be provided with a transmitter and a receiver, and the controller 1800 may determine whether an obstacle CA exists based on whether the ultrasonic wave radiated through the transmitter is reflected by an obstacle CA or the like and is received by the receiver, and may calculate the distance to an obstacle CA by using the ultrasonic radiation time and the ultrasonic reception time.

In addition, the controller 1800 may detect information related to the size of an obstacle CA by comparing the ultrasonic wave radiated from the transmitter and the ultrasonic wave received from the receiver. For example, the controller 1800 may determine the size of an obstacle CA to be larger as more ultrasonic waves are received by the receiver.

In one embodiment, a plurality of (e.g., five) ultrasonic sensors may be installed along the outer circumferential surface in the front side surface of the moving robot. At this time, preferably, the transmitter and the receiver of the ultrasonic sensor may be alternately installed in the front surface of the moving robot.

That is, the transmitter may be disposed to be spaced apart from the front center of the main body to the left and right sides, and one or more transmitters may be disposed between the receivers to form a reception area of the ultrasonic signal reflected from an obstacle CA or the like. Such a disposition allows the reception area to be extended while reducing the number of sensors. The transmission angle of the ultrasonic waves may be maintained within a range that does not affect the different signals so as to prevent crosstalk. In addition, the reception sensitivity of the receivers may be set differently.

In addition, the ultrasonic sensor may be installed upward by a certain angle so that the ultrasonic wave transmitted from the ultrasonic sensor is output upward, and, at this time, may further include a certain blocking member to prevent the ultrasonic wave from being radiated downward.

Meanwhile, as described above, the front detection sensor may use two or more types of sensors together, and accordingly, the front detection sensor may use any one type of sensor from among an infrared sensor, an ultrasonic sensor, an RF sensor, or the like.

For example, the front detection sensor may include an infrared sensor as another type of sensor in addition to the ultrasonic sensor. The infrared sensor may be installed in the outer circumferential surface of the moving robot together with the ultrasonic sensor. The infrared sensor may also detect obstacle CA existing in the front or side surface and transmit an obstacle CA information to the controller 1800. That is, the infrared sensor detects protrusions, household appliances, furniture, walls, wall edges, and the like existing in the moving path of the moving robot, and transmits the information to the controller 1800. Therefore, the main body of the moving robot may move within a specific area without colliding with an obstacle CA.

Meanwhile, the cliff detection sensor (or a cliff sensor) may detect an obstacle CA on the floor supporting the main body of the moving robot by mainly using various types of optical sensors. That is, the cliff detection sensor is installed in the back of the moving robot on the floor, but, obviously, may be installed in another position according to the type of moving robot.

The cliff detection sensor is positioned in the back of the moving robot to detect an obstacle CA on the floor. The cliff detection sensor may be an infrared sensor having a light emitting unit and a light receiving unit like an obstacle detection sensor CA, an ultrasonic sensor, an RF sensor, a position sensitive detector (PSD) sensor, and the like.

For example, one of the cliff detection sensors may be installed in the front side of the moving robot, and the other two cliff detection sensors may be installed in the relatively rear side. For example, the cliff detection sensor may be a PSD sensor, but may be configured of a plurality of different types of sensors.

The PSD sensor detects the positions of the short and long distances of an incident light with a single p-n junction by using the surface resistance of a semiconductor. The PSD sensor may include a one-dimensional PSD sensor that detects light only in the direction of a single axis, and a two-dimensional PSD sensor that may detect the position of light on a plane, and both PSD sensors may have a pin photodiode structure. The PSD sensor is a type of infrared sensor using infrared ray, and transmits an infrared ray to an obstacle CA and measures an angle of the infrared ray returned after being reflected by an obstacle CA, thus measuring a distance therebetween. That is, the PSD sensor calculates a distance to an obstacle CA using triangulation.

The PSD sensor includes a light emitting unit emitting infrared light to an obstacle CA and a light receiving unit receiving infrared light returned after being reflected by an obstacle CA. In general, the PSD sensor is implemented in the form of a module. If an obstacle CA is detected by using the PSD sensor, a stable measurement value may be obtained regardless of difference in reflectivity or color of an obstacle CA.

The sweeping unit 1900 cleans a designated cleaning area according to a control command transmitted from the controller 1800. The sweeping unit 1900 scatters the surrounding dust through a brush (not shown) that scatters the dust of the designated cleaning area, and then drives a suction fan and a suction motor to suck the scattered dust. In addition, the sweeping unit 1900 may wipe the designated cleaning area according to the replacement of a configuration.

In addition, the controller 1800 may detect a cliff and may analyze a depth, by measuring an infrared ray angle between a light emitting signal of an infrared ray emitted towards a floor surface by the cliff detection sensor, and a reflection signal received after being reflected by an obstacle CA.

Meanwhile, the controller 1800 may determine whether the robot cleaner can pass through a cliff based on a floor surface state of the cliff detected by the cliff detection sensor, and may decide whether to pass through the cliff according to a result of the determination. For instance, the controller 1800 may determine whether a cliff exists and a depth of the cliff, through the cliff detection sensor. Then, only when a reflection signal is detected through the cliff detection sensor, the controller 1800 controls the robot cleaner to pass through the cliff. As another example, the controller 1800 may determine a lifted state of the robot cleaner by using the cliff detection sensor.

Meanwhile, the two-dimensional camera sensor is provided in one surface of the mobile robot, and obtains image information related to the surroundings of the main body during movement. An optical flow sensor converts a downward image inputted from an image sensor provided in the sensor to generate image data of a certain format. The generated image data may be stored in the memory 1700.

In addition, one or more light sources may be installed near the optical flow sensor. The one or more light sources irradiate light onto a certain area of a floor surface photographed by the image sensor. That is, in a case where the robot cleaner moves within a specific area along the floor surface, if the floor surface is flat, a distance between the image sensor and the floor surface is uniformly maintained.

On the other hand, in a case where the moving robot moves along a floor surface having a non-uniform surface, the image sensor becomes far from the floor surface by more than a certain distance, due to a concavo-convex portion and an obstacle CA on the floor surface. Here, the controller 1800 may control the one or more light sources to control the amount of light to be irradiated. The light source may be a light emitting device which can control an optical amount, e.g., a light emitting diode (LED).

By using the optical flow sensor, the controller 1800 may detect the position of the moving robot regardless of the sliding of the moving robot. The controller 1800 may calculate the moving distance and the moving direction by comparing and analyzing the image data photographed by the optical flow sensor according to time, and may calculate the position of the moving robot based on this calculation. By using the image information on the lower side of the moving robot by using the optical flow sensor, the controller 1800 may perform a tough correction against the sliding with respect to the position of the moving robot calculated by other means.

The three-dimensional (3D) camera sensor may be attached to one surface or a part of the main body of the moving robot, thereby generating 3D coordinates information related to the surrounding of the main body. That is, the three-dimensional (3D) camera sensor may be a 3D depth camera for calculating a distance between the moving robot and an object to be photographed.

Specifically, the three-dimensional (3D) camera sensor may photograph two-dimensional (2D) image related to the surrounding of the main body, and may generate a plurality of 3D coordinates information corresponding to the photographed 2D image. More specifically, the 2D camera sensor may generate a plurality of 3D coordinate information based on the photographed 2D image of the floor spaced apart by a certain distance from the main body.

In an embodiment, the 3D camera sensor may be provided with the conventional two or more cameras for capturing 2D images, and may be implemented as a stereo vision type for generating 3D coordinates information by combining two or more images captured by the two or more cameras.

Specifically, in this embodiment, the 3D camera sensor may include a pattern irradiating unit for irradiating light of a certain pattern towards around the moving robot. The pattern irradiating unit may include a first pattern irradiating unit for downward irradiating light of a first pattern towards a front side of the main body, a second pattern irradiating unit for upward irradiating light of a second pattern towards a front side of the main body, and an image acquisition unit for acquiring images related to a front side of the main body. Accordingly, the image acquisition unit may acquire an image related to an area on which light of the first pattern and light of the second pattern have been incident.

In another embodiment, the 3D camera sensor may be provided with a single camera and an infrared ray pattern emitting portion for irradiating an infrared ray pattern. The 3D camera sensor may measure a distance between itself and an object to be photographed, by capturing a projection shape of an infrared ray pattern irradiated from the infrared ray pattern emitting portion, onto the object to be photographed. The 3D camera sensor may be an infra-red (IR) type of 3D camera sensor.

In another embodiment, the 3D camera sensor may be provided with a single camera and a light emitting unit for emitting light. The 3D camera sensor may measure a distance between itself and an object to be photographed, by receiving a part of the laser reflected by the object to be photographed among the laser emitted from the light emitting unit, and by analyzing the received laser. The 3D camera sensor may be a time of flight (TOF) type of 3D camera sensor.

More specifically, the 3D camera sensor is configured to irradiate a laser extended in at least one direction. For instance, the 3D camera sensor may be provided with a first laser portion and a second laser portion. The first laser portion may irradiate straight type lasers crossing each other, and the second laser portion may irradiate a single straight type laser. With such a configuration, a lowermost laser is used to detect an obstacle CA on a floor surface, an uppermost laser is used to detect an obstacle CA provided above, and an intermediate laser between the lowermost laser and the uppermost laser is used to detect an obstacle CA provided in a middle area.

The image acquisition unit obtains an image of the surroundings of the cleaner body 110 and/or an image of the obstacle CA and provides the image to the controller 1800. The image acquisition unit may photograph a 2D image related to the surroundings of the main body, and generate a plurality of 3D coordinate information corresponding to the photographed 2D image.

For example, the image acquisition unit may include a 3D camera or a depth camera.

Meanwhile, the communication unit 1100 is connected to a terminal device and/or other device (it will be used mixed with the term "home appliance" in this document) located in a specific area in one of the wired, wireless, satellite communication methods to transmit and receive signals and data.

The communication unit 1100 may transmit/receive data with other device located in a specific area. At this time, any other device is sufficient so long as other device can transmit and receive data by connecting to a network. For example, the other device may be a device such as an air conditioning device, a heating device, an air purifier, a lamp, a TV, a car, and the like. In addition, the other device may be a device for controlling a door, a window, a water valve, a gas valve, or the like. In addition, the other device may be a sensor that detects temperature, humidity, barometric pressure, gas, and the like.

In addition, the communication unit 1100 may communicate with another robot cleaner 100 located in a specific area or a certain range.

Although not shown, a plurality of moving robots may communicate with a terminal (not shown) through network communication, and may communicate with each other.

Here, the network communication may mean short-range communication using at least one of wireless communication technologies such as Wireless LAN (WLAN), Wireless Personal Area Network (WPAN), Wireless Fidelity (Wi-Fi), Wireless Fidelity (Wi-Fi) Direct, Digital Living Network Alliance (DLNA), Wireless Broadband (Wbro) World Interoperability for Microwave Access (WiMAX), Zigbee, Z-wave, Blue-Tooth, Radio Frequency Identification (RFID), Infrared Data Association (IrDA), Ultra-Band (UWB), Wireless Universal Serial Bus (Wireless USB), and the like.

The controller 1800 serves to process information based on artificial intelligence technology, and may include one or more modules that perform at least one of learning of information, inference of information, perception of information, and processing of natural language.

By using a machine learning technology, the controller 1800 may perform at least one of learning, inference, and processing with respect to a large amount of information (big data) such as information stored in a cleaner, environment information around a mobile terminal, and information stored in an external storage that can communicate.

The controller 1800 predicts (or infers) at least one action of the cleaner that can be executed by using information learned using a machine learning technology, and among the at least one predicted actions, and may control the cleaner to execute the most feasible one of the at least one predicted action. Machine learning technology is a technology that collects and learns a large amount of information based on at least one algorithm, and determines and predicts information based on the learned information.

Learning of information is an operation of grasping characteristics, rules, and determination reference of information, quantifying the relationship between information, and predicting new data using a quantized pattern.

The algorithm used by machine learning technology may be an algorithm based on statistics, for example, may be a decision tree that uses a tree structure form as a prediction model, an artificial neural network that mimics the structure and function of the neural network of a living organism, a genetic programming based on an evolutionary algorithm of a living organism, a clustering that distributes observed example into subset called cluster, a Monte carlo method that calculates function value with probability by using randomly extracted random numbers, and the like.

As a field of machine learning technology, deep learning technology is a technology that performs at least one of learning, determining, and processing of information by using a Deep Neural Network (DNN) algorithm. The Deep Neural Network (DNN) may have a structure that connects between layers and transfers data between layers. Such a deep learning technology allows to learn a large amount of information through a Deep Neural Network (DNN) using a graphic processing unit (GPU) optimized for parallel computing.

The controller 1800 may use a training data stored in an external server or in the memory, and may include a learning engine that detects a characteristic for recognizing a certain object. At this time, the characteristic for recognizing the object may include the size, shape, and shadow of the object.

In detail, when the controller 1800 inputs a part of the image acquired through the image acquisition unit provided in the cleaner to the learning engine, the learning engine may recognize at least one object or a living organism included in the input image. More specifically, the controller 1800 may recognize a general obstacle CA and a mat-type obstacle among the recognized objects through various methods.

As described above, when the learning engine is applied to the traveling of the cleaner, the controller 1800 may recognize whether an obstacle CA, such as a chair leg, a fan, and a balcony crack of a certain shape, which hinders the traveling of the cleaner exists around the cleaner. Thus, the efficiency and reliability of the traveling of the cleaner can be improved.

Meanwhile, the above described learning engine may be mounted in the controller 1800 or may be mounted in an external server. When the learning engine is mounted in the external server, the controller 1800 may control the communication unit 1100 to transmit at least one image to be analyzed to the external server.

The external server may recognize at least one object or life included in a corresponding image by inputting the image received from the cleaner to the learning engine. In addition, the external server may transmit information related to the recognition result again to the cleaner. In this case, the information related to the recognition result may include the number of objects included in the image to be analyzed and information related to the name of each object.

For example, the controller 1800 analyzes an image and a distance acquired by the image acquisition unit in the cleaning area, determines whether there is an obstacle CA located around the main body, and determines the avoidance of the moving robot when the height H1 of the obstacle CA is equal to or greater than a reference height. When the height H1 of the obstacle CA is smaller than the reference height, the controller 1800 calculates the planar area of the obstacle CA, and may determine the climbing or avoidance of the main body based on the planar area of the obstacle CA.

The controller 1800 may distinguish the obstacle CA into a general obstacle CA and a mat type obstacle CA according to the above-described information learning or a given reference. For example, the controller 1800 may control the robot cleaner 100 to recognize an object by big data or machine learning, and to avoid or climb the object according to the characteristics of each object.

In the cleaning area, there also exists a wide obstacle CA such as a mat, but there exists a rail or chassis that defines the boundary of each space or guide the door between each space. If the robot cleaner recognizes the rail or chassis simply as an obstacle CA and decides to climb the rail or chassis based on only the height, there is a risk that the robot cleaner may overturn during the climbing due to the small width of the rail or the chassis, and the robot cleaner will fall into the floor opposite side of the rail or the chassis during the movement. When the robot cleaner falls to the opposite side of the rail or chassis, and if the depth of the floor opposite to the rail and chassis is great, the robot cleaner cannot be returned and cannot clean the traveling area, and there is a risk of damage due to the fall.

Hereinafter, in order to solve the above-described problem, the method of determining whether the robot cleaner climbs the obstacle CA in consideration of the height H1 of the obstacle CA, the depth D1 of the front floor surface B2, and the like will be described in detail.

FIG. 5 is a diagram illustrating a robot cleaner that measures a depth of a floor surface beyond an obstacle, and avoids the obstacle CA according to an embodiment of the present disclosure.

Figure 5A:
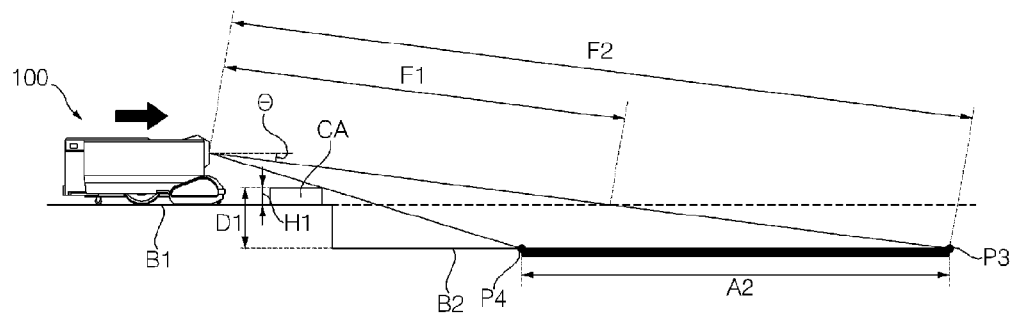
FIGS. 5A and 5B are diagrams illustrating a robot cleaner that measures a depth of a floor surface beyond an obstacle, and avoids the obstacle according to an embodiment of the present disclosure.
Figure 5B:
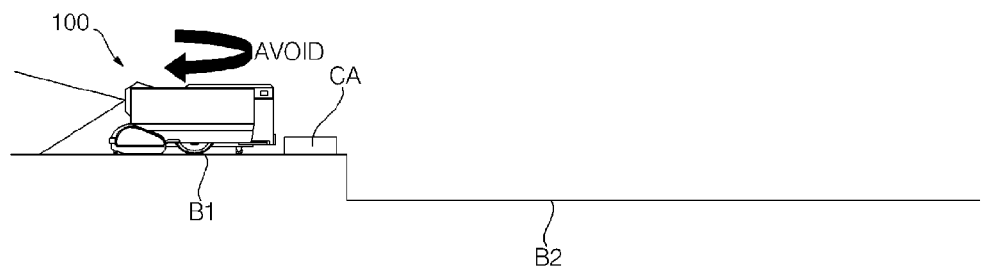

Referring to FIGS. 5A and 5B, the controller 1800 analyzes the image acquired by the image acquisition unit and calculates the height H1 of an obstacle CA and the depth D1 of the floor surface B2, and may control the driving motor based on the height H1 of the obstacle CA and the depth D1 of the front floor surface B2. Therefore, the moving robot can previously recognize the cliff beyond the obstacle CA, thereby preventing the moving robot from being trapped in the cliff or being returned.

As another example, the controller 1800 analyzes the pattern in the image acquired by the image acquisition unit and calculates the height H1 of an obstacle CA and the depth D1 of the front floor surface B2, and may control the driving motor based on the height H1 of an obstacle CA and the depth D1 of the front floor surface B2.

In detail, the controller 1800 may control the driving motor so that the moving robot can avoid an obstacle CA, when the height H1 of an obstacle CA is smaller than the reference height and the depth D1 of the front floor surface B2 is greater than the reference depth. Even if an obstacle CA positioned in front of the moving robot has a climbable height, it is determined whether to climb in consideration of the depth of the floor surface positioned in front of the obstacle CA.

Here, the depth D1 of the front floor surface B2 may mean the depth of one point P3 of the area A2 spaced forward from the moving robot by a certain distance, or may mean an average depth of a plurality of points P3 and P4 selected in the spaced area A2.

Preferably, the depth D1 of the front floor surface B2 may be a depth of the floor surface spaced forward by 30 cm to 90 cm from the moving robot. More preferably, the depth D1 of the front floor surface B2 may be a depth of the floor surface spaced forward by 50 cm to 70 cm from the moving robot. Alternatively, the depth D1 of the front floor surface B2 may be a depth of the floor surface spaced by 40 cm to 70 cm from the boundary between an obstacle CA positioned in front of the moving robot and the reference floor surface B1.

By measuring the depth of the floor spaced apart from the moving robot by a certain distance, it is possible to distinguish whether an obstacle CA positioned in front of the moving robot is a mat type obstacle CA or a rail type obstacle CA.

In addition, the depth D1 of the front floor surface B2 may be the depth of the floor surface of the area positioned in front of the boundary between an obstacle CA and the reference floor surface B1. To this end, when an obstacle CA is detected in front of the robot cleaner, the robot cleaner may approach an obstacle CA to detect the front floor surface B2. Here, the reference floor surface B1 may be a floor surface of the area where the moving robot is positioned.

The depth D1 of the front floor surface B2 is a sum of the height H1 value of an obstacle CA and a step value between the present floor surface where the moving robot is currently positioned and the front floor surface B2. That is, the depth D1 of the front floor surface B2 becomes the height H1 of an obstacle CA for the moving robot to climb again from the opposite side of an obstacle CA.

The depth D1 of the front floor surface B2 may be set to the same value as the climbable height of the moving robot. Preferably, the reference depth is between −2 cm and 3 cm, more preferably, the reference depth may be between 0 cm and 2 cm. Here, when the reference depth is negative, the height of the front floor surface B2 is higher than the height H1 of an obstacle CA.

As another example, when the front floor surface B2 is higher than the height H1 of an obstacle CA, the front floor surface B2 is classified as an obstacle CA, so that the moving robot can decide whether to climb according to the height H1 of an obstacle CA.

In order to accurately detect the front floor surface B2, the sensing unit 130 is preferably positioned in the front upper end of the cleaner body. Preferably, the sensing unit 130 may be positioned at the height of 15 cm to 30 cm from the bottom of the wheel. This is because the sensing unit 130 must be mounted high so as to detect the depth of the floor surface beyond an obstacle CA.

The sensing unit 130 may calculate the depth D1 of the front floor surface B2 through the distance between the sensing unit and the front floor surface B2 positioned in a direction having a certain angle θ downward from the front.

Specifically, the depth D1 of the front floor surface B2 may be calculated by receiving a portion reflected from the front floor surface B2 among the lasers emitted toward between the front and the bottom, analyzing the received laser, measuring the distance F2 between the three-dimensional camera sensor and the front floor surface B2, and comparing the distance F2 with the reference distance F1. In addition, the depth D1 of the front floor surface B2 may be calculated by irradiating a certain pattern of light toward the front floor from the moving robot, detecting a pattern from the acquired image, calculating the distance F2 to the pattern based on the pattern, and comparing the calculated distance F2 to the pattern with the reference distance F1.

The reference distance F1 refers to the distance between an extension line of the reference floor surface B1 and the sensing unit 130. When the distance F2 to the pattern is larger than the reference distance F1, it is determined that the depth D1 of the front floor surface B2 is deeper than the reference floor surface B1.

As another example, the controller 1800 may acquire a 3D coordinate value of the moving robot from an image acquired by the depth camera, and may calculate the depth D1 of the front floor surface B2 positioned in front of an obstacle CA based on the 3D coordinate value.

FIG. 6 is a diagram illustrating a robot cleaner that measures a depth of a floor surface beyond an obstacle CA, climbs the obstacle ca, and is returned to its place according to an embodiment of the present disclosure.

If the height H1 of an obstacle CA is smaller than the reference height and the depth D1 of the front floor surface B2 is smaller than the reference depth, the controller 1800 can control the driving motor to climb the obstacle CA.

Figure 6A:
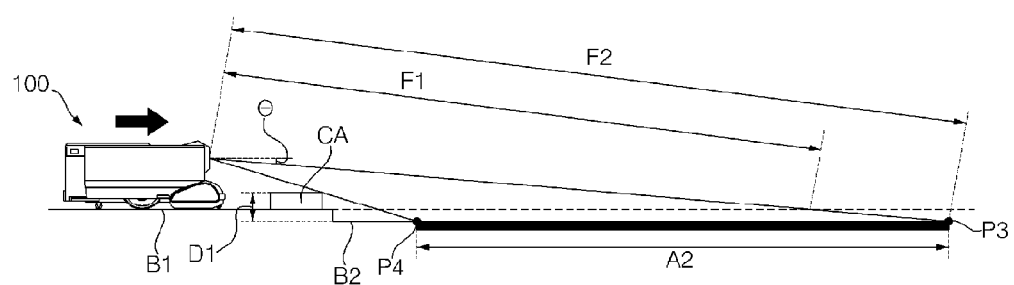
FIGS. 6A to 6D are diagrams illustrating a robot cleaner that measures a depth of a floor surface beyond an obstacle, climbs the obstacle, and is returned to its place according to an embodiment of the present disclosure.

Referring to FIG. 6A, as described with reference to FIG. 5A, when the sensing unit 130 measures the height H1 of an obstacle CA and the depth D1 of the front floor surface B2, based on this, the controller 1800 determines whether to climb the obstacle CA.

Figure 6B:
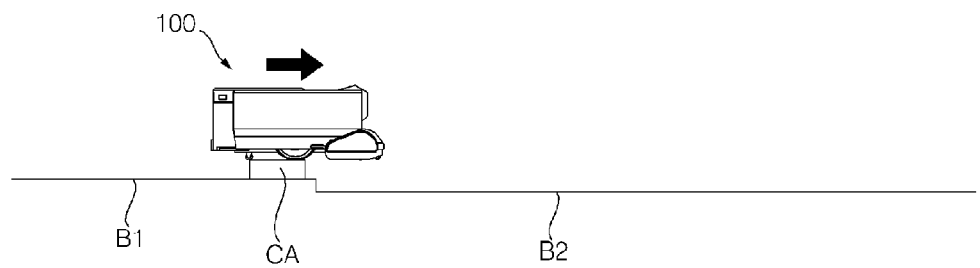

Referring to FIG. 6B, when the height H1 of an obstacle CA is smaller than the reference height and the depth D1 of the front floor surface B2 is smaller than the reference depth, the moving robot climbs the obstacle CA.

Figure 6C:
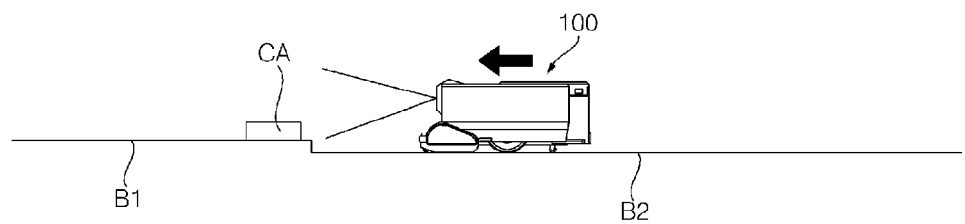
Figure 6D:
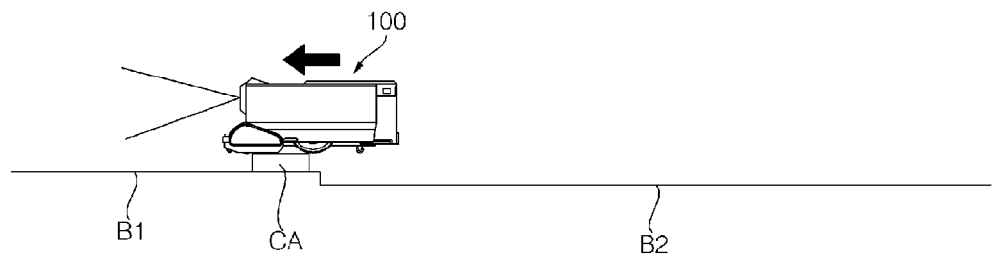

Referring to FIG. 6C, the moving robot may travel an area including the front floor surface B2, after climbing an obstacle CA. Referring to FIG. 6D, when finishing the traveling on the area including the front floor surface B2, the moving robot may be returned to the reference floor surface B1.

When the robot cleaner climbs a rail type obstacle CA, if the left wheel 111a and the right wheel 111b of the robot cleaner do not contact the obstacle CA simultaneously, the robot cleaner may be restrained by the obstacle CA, or may fail to climb the obstacle CA.

Hereinafter, in order to solve the above-described problem, a method for making the entry angle θ of the robot cleaner to be perpendicular to the boundary line BL of an obstacle CA will be described in detail.

Figure 7A:
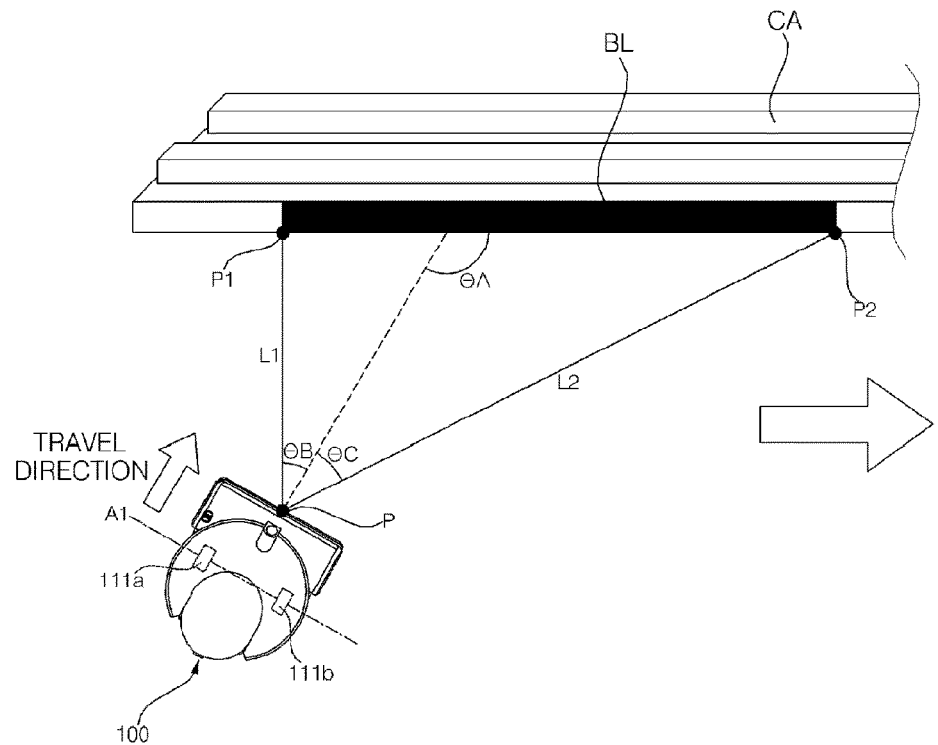
FIGS. 7A to 7C are diagrams illustrating that a robot cleaner according to a first embodiment of the present disclosure calculates an entry angle and changes the entry angle into a normal entry angle.

FIG. 7 is a diagram illustrating that a robot cleaner according to a first embodiment of the present disclosure calculates an entry angle θ and changes the entry angle θa Referring to FIG. 7A, the controller 1800 analyzes an image acquired by the image acquisition unit to detect the entry angle θ of the moving robot with respect to an obstacle CA, and can control the moving robot to climb the obstacle CA according to the entry angle θ of the moving robot.

Here, the entry angle θ of the moving robot means an angle formed by the traveling direction of the moving robot and the boundary line BL of the obstacle CA and the floor surface. Alternatively, the entry angle θg robot may mean an angle formed by a line perpendicular to the rotation axis A1 of the wheel and the side surface of an obstacle CA.

Here, the boundary line BL of an obstacle CA and the floor may mean a boundary line between the surface facing the traveling direction of the moving robot and the floor in an obstacle CA. Obviously, when the boundary line BL of an obstacle CA and the floor is curved, it may be a straight line connecting both ends of obstacle CA and the floor boundary line BL or may be a virtual line connecting two points spaced apart from an obstacle CA and a floor boundary BL.

When the side surface of an obstacle CA is curved, a virtual surface connecting between both ends of the side surface of an obstacle CA entered on the angle of view may be determined as the side surface of an obstacle.

In the present embodiment, the boundary line BL between the side surface of an obstacle CA and the boundary line BL of an obstacle CA and the floor are a straight line.

Various methods of calculating the entry angle θ of the moving robot are available. For example, the entry angle θa a the two-dimensional image. detail, the controller 1800 may calculate an angle at which the side surface of an obstacle CA and the boundary line BL of the obstacle CA and the floor are inclined in the traveling direction of the moving robot, based on the plurality of three-dimensional coordinate and the two-dimensional image.

For example, on the plane viewed from the top, the moving robot irradiates light in a direction inclined to the left at a first angle θ with respect to the front direction in a reference point P, receives the reflected light, calculates a first separation distance L1 between a left one point P1 of the side surface of an obstacle CA and the reference point P, irradiates light in a direction inclined at a second angle θ equal to the first angle Deference point P and receives the reflected light, and calculates a second separation distance L2 between a right one point P2 of the side surface of an obstacle CA and the reference point P.

The controller 1800 may calculate the entry angle θ by comparing the first separation distance L1 and the second separation distance L2. When the first separation distance L1 and the second separation distance L2 are the same, the entry angle θ is 90°.

As another example, the controller 1800 may define a boundary of an obstacle CA in a map generated based on a plurality of two-dimensional coordinate and a two-dimensional image, and may calculate an inclination angle between a portion of the boundary of the defined obstacle CA and the traveling direction of the moving robot.

The controller 1800 may control the moving robot so that the entry angle of the moving robot does not change when the entry angle is detected. The controller 1800 may drive a first driving motor and a second driving motor at a lower speed than the normal speed when the entry angle is detected. In this case, the first driving motor and the second driving motor may be driven at the same speed. As another example, the controller 1800 may stop the first driving motor and the second driving motor when the entry angle is detected. If the driving motor is stopped when the entry angle is detected, an accurate entry angle can be detected.

When the entry angle θ of the moving robot is a non-normal entry angle, the controller 1800 can control the first driving motor 1310 and the second driving motor 1320 so that the entry angle θa Here, the normal entry angle means that the moving robot enters nearly perpendicular to the boundary of an obstacle CA. Specifically, the normal entry angle may be an entry angle θ of 87° to 93°. Preferably, the normal entry angle may be an entry angle θA of 88° to 92°. More preferably, the normal entry angle may be set to 89° to 91°.

The non-normal entry angle means an entry angle θ excluding the normal entry angle. The non-normal entry angle means that the moving robot enters not perpendicular to the boundary of an obstacle CA.

As shown in FIG. 5A, when the entry angle θ is a non-normal entry angle, the controller 1800 controls the first driving motor 1310 and the second driving motor 1320 to rotate the moving robot at a certain angle in one direction in place, or can improve or decrease the output of any one of the first driving motor 1310 and the second driving motor 1320 while moving forward. Such a control of the controller 1800 may be defined as correcting a posture of the moving robot.

Specifically, when the first separation distance L1 is smaller than the second separation distance L2, the controller 1800 can rotate the moving robot by allowing the right wheel 111b to move forward through the second driving motor 1320. The controller 1800 may repeat such an operation until the first separation distance L1 and the second separation distance L2 become equal within an error range.

Figure 7B:
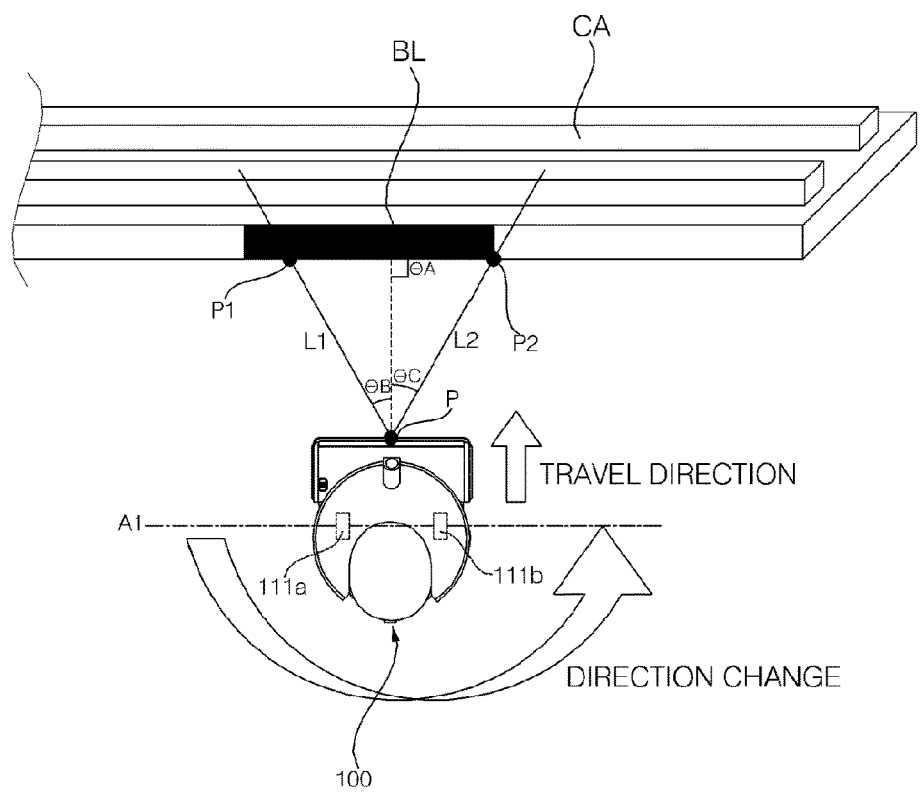
Figure 7C:
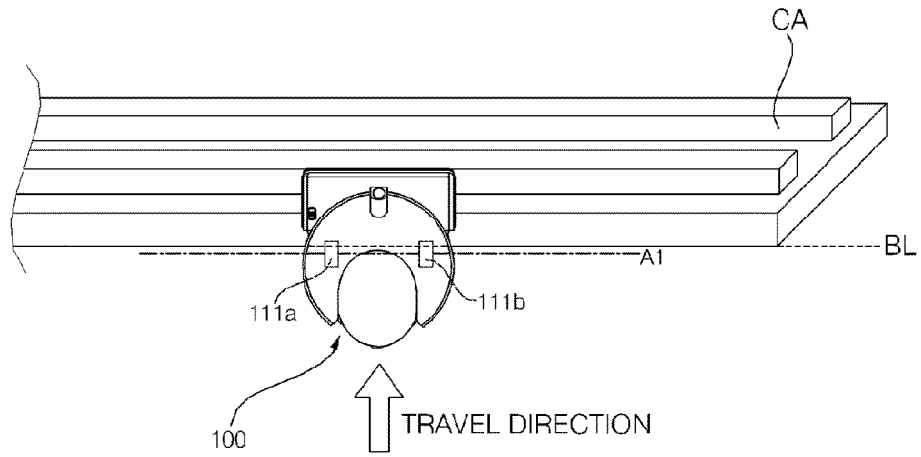

Referring to FIGS. 7B and 7C, when the entry angle θ of the moving robot is a normal entry angle, the controller 1800 may control the first driving motor 1310 and the second driving motor 1320 so that the moving robot climbs an obstacle CA. Specifically, when the entry angle θ of the moving robot is the normal entry angle, the controller 1800 simultaneously controls the first driving motor 1310 and the second driving motor 1320 at the same speed, so that the moving robot can progress while maintaining the original direction (progress direction). Obviously, the controller 1800 may increase the output of the first driving motor 1310 and the second driving motor 1320 when the wheel contacts an obstacle CA.

Figure 8:
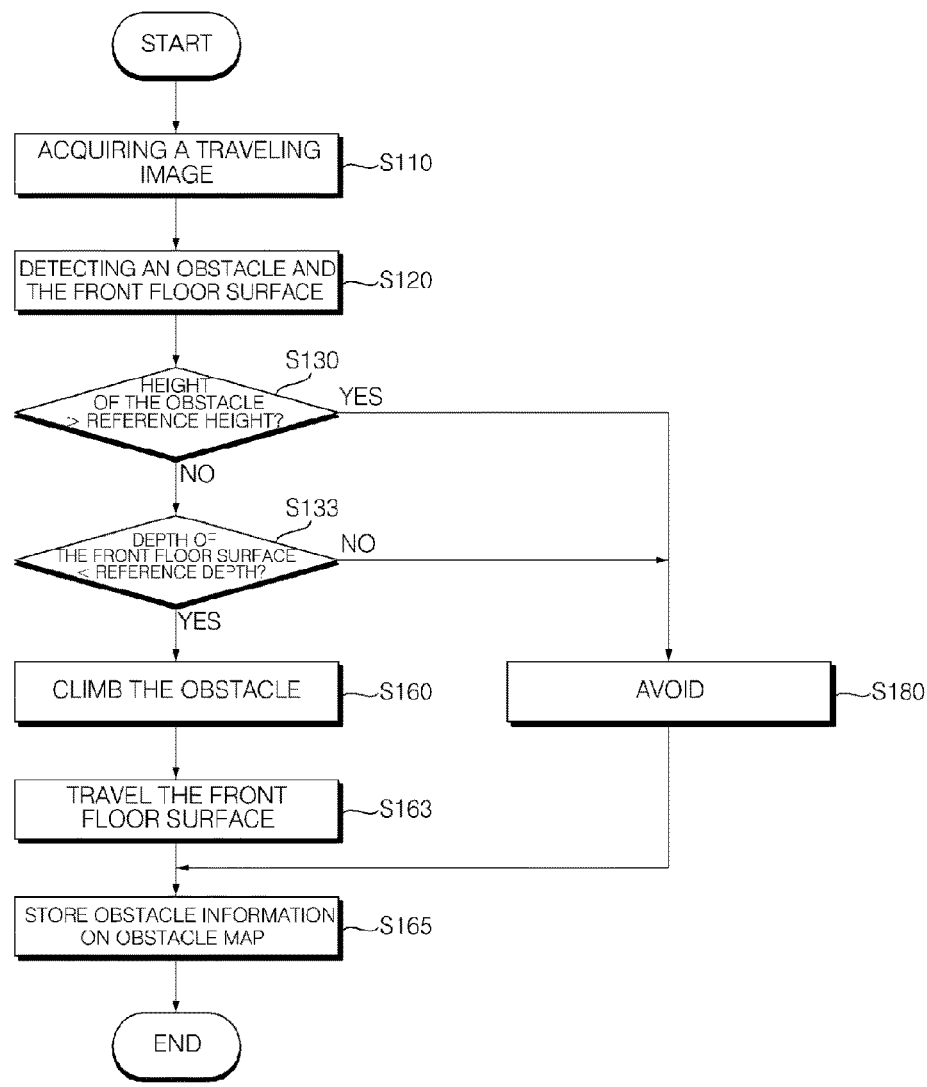
FIG. 8 is a flowchart illustrating a control method of a robot cleaner according to an embodiment of the present disclosure.

FIG. 8 is a flowchart illustrating a control method of a robot cleaner according to an embodiment of the present disclosure.

Hereinafter, the control method of the robot cleaner 100 of the present disclosure will be described in detail with reference to FIG. 8. Contents overlapped with each other in the flowchart are denoted by the same reference numerals, and the overlapped description is omitted.

The control method may be performed by the controller 1800. The present disclosure may be a control method of the robot cleaner 100, or may be a robot cleaner 100 including a controller 1800 performing a control method. The present disclosure may be a computer program including each step of a control method, or may be a recording medium on which a program for implementing a control method using a computer is recorded. The "recording medium" means a computer-readable recording medium. The present disclosure may be a robot cleaner 100 control system including both hardware and software.

Each step of the flowchart drawings of the control method and a combination of the flowchart drawings may be performed by computer program instructions. The instructions may be mounted in a general purpose computer or special purpose computer, etc., such that the instructions create means for performing the functions described in the flowchart step(s).

In addition, in some embodiments, the functions mentioned in the steps can be out of order. For example, two steps shown in succession may be performed substantially simultaneously or the steps may sometimes be performed in the reverse order, according to a corresponding function.

The control method of the moving robot according to an embodiment of the present disclosure may include an image acquisition step (S110) of acquiring an image of the front of the moving robot, a detection step (S120) of detecting an obstacle CA and the front floor surface B2 in front of the obstacle CA from the acquired image, calculation steps of calculating the height H1 of the obstacle CA and the depth D1 of the front floor surface B2, and climbing avoidance steps (S130, S133, S160, S180) in which the mobile robot climbs or avoids the obstacle CA based on the height H1 of the obstacle CA and the depth D1 of the front floor surface B2.

In the image acquisition step (S110), the robot cleaner 100 acquires a near and remote distance between the image around the robot cleaner 100 and an obstacle CA and a three-dimensional coordinate of the surroundings of the moving robot in real time while traveling. The controller 1800 may control the image acquisition unit and acquire an image and a three-dimensional coordinate of the surroundings of the robot cleaner 100 at regular intervals while traveling.

Here, the image around the robot cleaner 100 may include the front and side surfaces of the robot cleaner 100.

In the detection step (S120), the robot cleaner 100 detects the obstacle CA and the front floor B2 in front of the obstacle CA based on surrounding image and 3D coordinate information. When the robot cleaner detects the obstacle CA and does not detect the front floor surface B2 in the detection step S120, the robot cleaner determines the climbing of the obstacle CA by a general obstacle CA climbing determination method. When the depth D1 of the front floor surface B2 is smaller than zero, the robot cleaner may determine that the front floor surface B2 does not exist.

In the calculation steps (S120), the robot cleaner calculates the height H1 of the obstacle CA, the depth D1 of the front floor surface B2, the distance to the obstacle CA, and the like. In detail, when the obstacle CA is detected, the robot cleaner may measure the depth D1 of the front floor surface B2 by approaching the obstacle CA within a certain distance. The measurement and calculation methods of the depth D1 of the front floor surface B2, the height of the obstacle CA, and the like are as described above.

In the climbing avoidance steps (S130, S133, S160, S180), the robot cleaner determines whether to avoid the obstacle CA based on the height H1 of the obstacle CA and the depth D1 of the front floor B2 (S180). Specifically, the controller 1800 calculates the height H1 of the obstacle CA based on the three-dimensional coordinates and the two-dimensional image of the obstacle CA. When the height H1 of the obstacle CA is greater than a reference height, the controller 1800 controls the traveling unit 1300 so that the robot cleaner can avoid the obstacle CA (S180). Here, the avoidance of the obstacle CA means that the controller 1800 controls the traveling unit 1300 so that the robot cleaner 100 travels or cleans the cleaning area excluding the obstacle CA.

Obviously, the avoidance can be determined only by the height H1 of the obstacle CA. However, when the height H1 of the obstacle CA is low, in order to determine the case of the obstacle CA that cannot be climbed, such as a towel, the planar area of the obstacle CA may be calculated to determine whether to avoid the obstacle CA. Specifically, the robot cleaner 100 calculates the plane area of the obstacle CA. The planar area of the obstacle CA specifies the overall shape of the obstacle CA and the boundary of the obstacle CA by the image acquisition unit. The width, length, and height information of the obstacle CA are combined to display the shape of a mat type obstacle CA on a planar coordinate system, and the planar area of the mat type obstacle CA can be calculated. When the planar area of the obstacle CA exceeds a preset planar value, the robot cleaner 100 may determine the obstacle CA as a climbable obstacle CA.

In the climbing avoidance steps (S130, S133, S160, S180), when the height H1 of the obstacle CA is smaller than a reference height and the depth D1 of the front floor surface B2 is smaller than a reference depth, the robot cleaner may climb the obstacle CA (S160). Here, the fact that the robot cleaner climbs the obstacle CA means that the robot cleaner goes up the upper end of the obstacle CA.

In the climbing avoidance steps (S130, S133, S160, S180), when the height H1 of the obstacle CA is smaller than the reference height and the depth D1 of the front floor surface B2 is deeper than the reference depth, the robot cleaner may avoid the obstacle CA (S180).

After climbing the obstacle CA, the robot cleaner may move to the front floor surface B2 and travel the front floor surface B2 (S163).

In addition, when the moving robot climbs or avoids the obstacle CA, the embodiment may further include a registration step (S165) of registering the obstacle CA on an obstacle CA map as a climbable obstacle CA. In detail, the robot cleaner 100 may store information on whether the obstacle CA is climbable and a two-dimensional boundary line of the obstacle CA on the obstacle CA map, and transmit the map to other robot cleaner 100.

Figure 9:
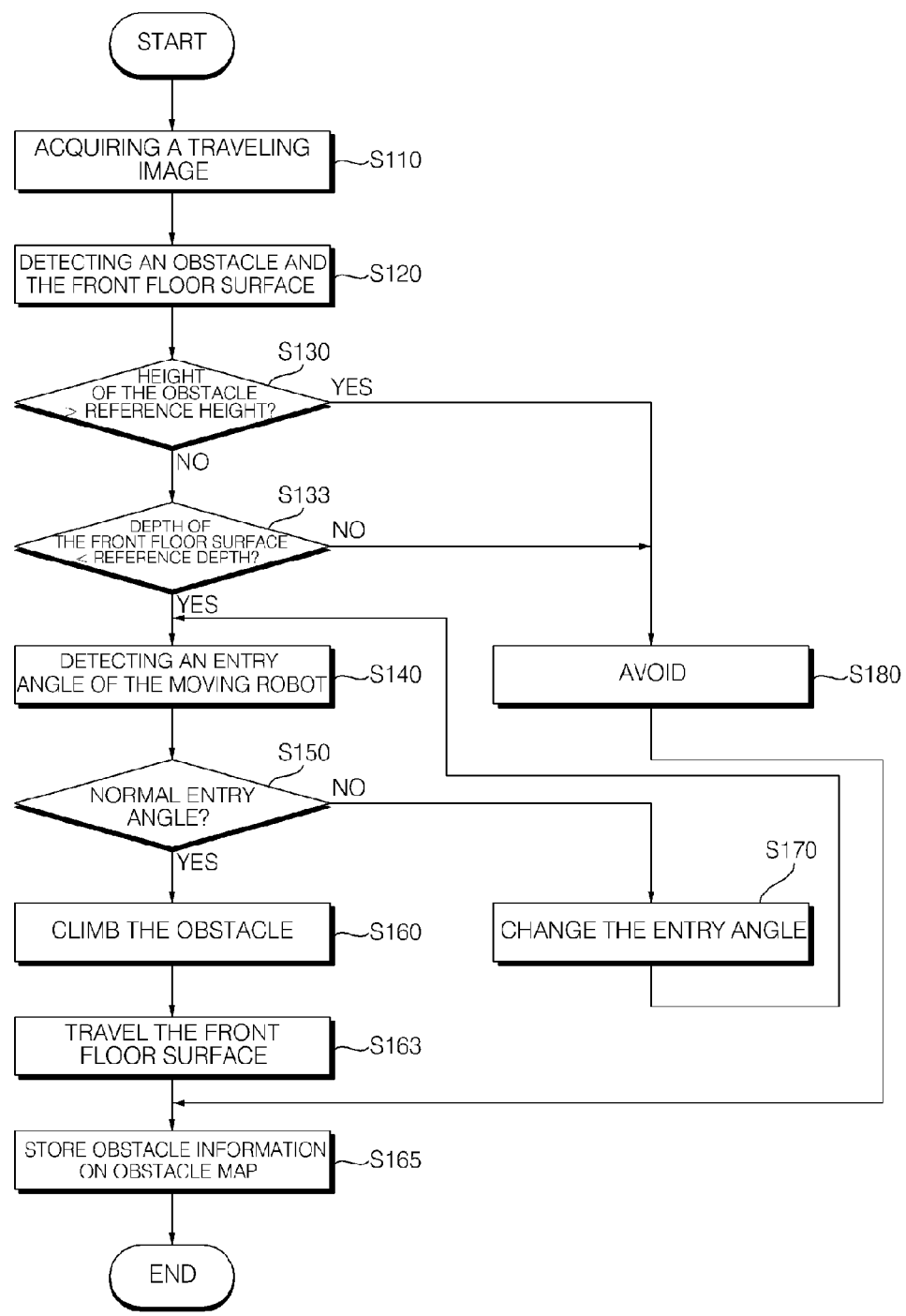
FIG. 9 is a flowchart illustrating a control method of a robot cleaner according to another embodiment of the present disclosure.

FIG. 9 is a flowchart illustrating a control method of a robot cleaner according to another embodiment of the present disclosure.

In comparison with the embodiment of FIG. 8, there is a difference in that the embodiment of FIG. 9 further includes a control method in which the robot cleaner enters an obstacle CA at a normal entry angle after determining the obstacle CA as a climbable obstacle CA. Hereinafter, the differences from FIG. 8 will be described mainly.

In one embodiment of the present disclosure, the method for controlling a moving robot may include an entry angle $\theta$ detection step S140 of detecting an entry angle $\theta\theta$ In the entry angle $\theta$ detection step S140, when the obstacle CA does not need to be avoided (i.e., when the height H1 of the obstacle CA is smaller than the reference height and the depth D1 of the front floor surface B2 is smaller than the reference depth), the robot cleaner detects the entry angle $\theta$ of the robot cleaner with respect to the obstacle CA. The detection of the entry angle $\theta$7.

In the determination steps (S150, S160, S170) of determining whether to climb the obstacle CA, it is determined whether to climb the obstacle CA according to the entry angle $\theta$ of the robot cleaner. Specifically, in the determination step (S150, S160, S170) of determining whether to climb the obstacle CA, the robot cleaner determines whether the entry angle $\theta$ is a normal entry angle (S150). If the entry angle $\theta\theta$a cleaner changes the entry angle $\theta$ by correcting the posture (S170). In the corrected posture, the robot cleaner may execute again the entry angle $\theta$ obstacle CA.

Obviously, even though the robot cleaner has corrected the posture several times, when the entry angle $\theta$ is not a normal entry angle, the robot cleaner may change the angle range of the normal entry angle, and may execute again the entry angle $\theta$A detection step S140 and the determination steps (S150, S160, S170) of determining whether to climb the obstacle CA.

Specifically, even when the entry angle $\theta$ does not become a normal entry angle even after several posture corrections, the robot cleaner changes the angle range of the normal entry angle to be 86° to 94°, thereby executing again the entry angle $\theta$ detection step S140 and the determination steps (S150, S160, S170) of determining whether to climb the obstacle CA.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

EXPLANATION OF NUMERAL

100: ROBOT
110: CLEANER BODY

120: CLEANING UNIT
130: SENSING UNIT
140: DUST CONTAINER

The invention claimed is:

1. A method of controlling a moving robot, the method comprising:
   an image acquisition step of acquiring an image of a front of the moving robot;
   a detection step of detecting an obstacle and a front floor surface in front of the obstacle from the acquired image;
   a calculation step of calculating a height of the obstacle and a depth of the front floor surface; and
   a climbing avoidance step of climbing or avoiding the obstacle by the moving robot based on the height of the obstacle and the depth of the front floor surface,
   wherein, in the climbing avoidance step, the moving robot climbs the obstacle when the height of the obstacle is smaller than a reference height and the depth of the front floor surface is smaller than a reference depth.

2. The method of claim 1, wherein, in the climbing avoidance step, the moving robot avoids the obstacle, when the height of the obstacle is smaller than a reference height and the depth of the front floor surface is deeper than a reference depth.

3. The method of claim 1, wherein, in the climbing avoidance step, the moving robot avoids the obstacle, when the height of the obstacle is higher than a reference height.

4. The method of claim 1, wherein the depth of the front floor surface is a summed value of a height value of the obstacle and a step value between a present floor surface where the moving robot is currently positioned and the front floor surface.

5. The method of claim 1, wherein the depth of the front floor surface is a depth of the floor surface spaced by 30 cm to 90 cm forward from the moving robot.

6. The method of claim 1, wherein the depth of the front floor surface is set to the same value as a climbable height of the moving robot.

7. The method of claim 1, wherein the depth of the front floor surface is calculated by irradiating a light of a certain pattern toward a front floor by the moving robot, detecting the pattern from the acquired image, calculating a distance to the pattern based on the pattern, and comparing the calculated distance to the pattern with a reference distance.

8. The method of claim 1, further comprising a registration step of registering the obstacle on an obstacle map as a climbable obstacle, when the moving robot climbs or avoids the obstacle.

9. A moving robot comprising:
   a first driving motor and a second driving motor configured to drive a wheel;
   a sensor configured to acquire an image of surroundings of the moving robot and an image of an obstacle; and
   a controller configured to control the first driving motor and the second driving motor by analyzing the image acquired by the image acquisition unit,
   wherein the controller analyzes the image acquired by the image acquisition unit, calculates a height of the obstacle and a depth of a front floor surface, and controls the driving motor based on the height of the obstacle and the depth of the front floor surface, and
   wherein the controller controls the driving motor so that the moving robot climbs the obstacle, when the height of the obstacle is smaller than a reference height and the depth of the front floor surface is smaller than a reference depth.

10. The moving robot of claim 9, wherein the controller controls the driving motor so that the moving robot avoids the obstacle, when the height of the obstacle is smaller than a reference height and the depth of the front floor surface is deeper than a reference depth.

11. The moving robot of claim 9, wherein the depth of the front floor surface is a summed value of a height value of the obstacle and a step value between a present floor surface where the moving robot is currently positioned and the front floor surface.

12. The moving robot of claim 9, wherein the depth of the front floor surface is a depth of the floor surface spaced by 30 cm to 90 cm forward from the moving robot.

13. The moving robot of claim 9, wherein the depth of the front floor surface is set to the same value as a climbable height of the moving robot.

14. A moving robot comprising:
   a first driving motor and a second driving motor configured to drive a wheel;
   a pattern irradiation unit configured to irradiate a light of a certain pattern to surroundings of the moving robot;
   an image acquisition unit configured to acquire an image of the surroundings of the moving robot and an image of an obstacle; and
   a controller configured to control the first driving motor and the second driving motor by analyzing the pattern from the image acquired by the image acquisition unit,
   wherein the controller analyzes the pattern from the image acquired by the image acquisition unit, calculates a height of the obstacle and a depth of a front floor surface, and controls the driving motor based on the height of the obstacle and the depth of the front floor surface, and
   wherein the controller controls the driving motor so that the moving robot climbs the obstacle when the height of the obstacle is smaller than a reference height and the depth of the front floor surface is smaller than a reference depth.

15. The moving robot of claim 14, wherein the pattern irradiation unit irradiates a light of the pattern to between a front side and a lower side of the moving robot.

16. The moving robot of claim 15, wherein the controller calculates the depth of the front floor surface by detecting the pattern from the acquired image, calculating a distance to the pattern based on the pattern, and comparing the calculated distance to the pattern with a reference distance.

17. The moving robot of claim 14, wherein the controller controls the driving motor so that the moving robot avoids the obstacle, when the height of the obstacle is smaller than a reference height and the depth of the front floor surface is deeper than a reference depth.

* * * * *